(12) United States Patent
Kennedy

(10) Patent No.: US 6,962,130 B1
(45) Date of Patent: Nov. 8, 2005

(54) GARDEN POND SHELTER REEF

(76) Inventor: James P. Kennedy, 171 Telyea St., Canandaigua, NY (US) 14424

( * ) Notice: Subject to any disclaimer, the term of this patent is extended or adjusted under 35 U.S.C. 154(b) by 5 days.

(21) Appl. No.: 10/763,754

(22) Filed: Jan. 26, 2004

Related U.S. Application Data

(60) Provisional application No. 60/442,744, filed on Jan. 27, 2003.

(51) Int. Cl.[7] ............................................. A01K 61/00
(52) U.S. Cl. ...................................... 119/221; 119/208
(58) Field of Search ........................ 119/221, 452, 223, 119/215, 208, 209

(56) References Cited

U.S. PATENT DOCUMENTS

| | | | | |
|---|---|---|---|---|
| 4,997,311 A | * | 3/1991 | Van Doren | 405/30 |
| 5,836,265 A | * | 11/1998 | Barber et al. | 119/221 |
| 5,967,086 A | * | 10/1999 | Knott, Sr. | 119/223 |
| 6,186,702 B1 | * | 2/2001 | Bartkowski | 405/25 |

FOREIGN PATENT DOCUMENTS

FR      EP0345184 A1 * 6/1989 .......... A01K 61/00

* cited by examiner

Primary Examiner—Robert P. Swiatek
(74) Attorney, Agent, or Firm—Robert J. Bird

(57) ABSTRACT

An artificial pond reef is formed from sheet material into the shape of an inverted tub. It includes a peripheral base portion, upstanding sidewalls, and a roof. The base portion includes a horizontal flange extending out from the sidewalls. The sidewalls extend up to support the roof and include apertures for movement of fish and the like through the reef. The reef includes small holes for the growth of flora therethrough. The roof is configured to support and retain decorative enhancements (pebbles, sand, plants). The base, sidewalls, roof are surface-shaped and contoured to give the reef an appearance of natural rock formation. The reef is dark or black to promote bacteria growth upon it, and has a matte surface for bacteria to adhere to. The roof includes an opening to receive a removable receptacle for decorative enhancements.

4 Claims, 1 Drawing Sheet

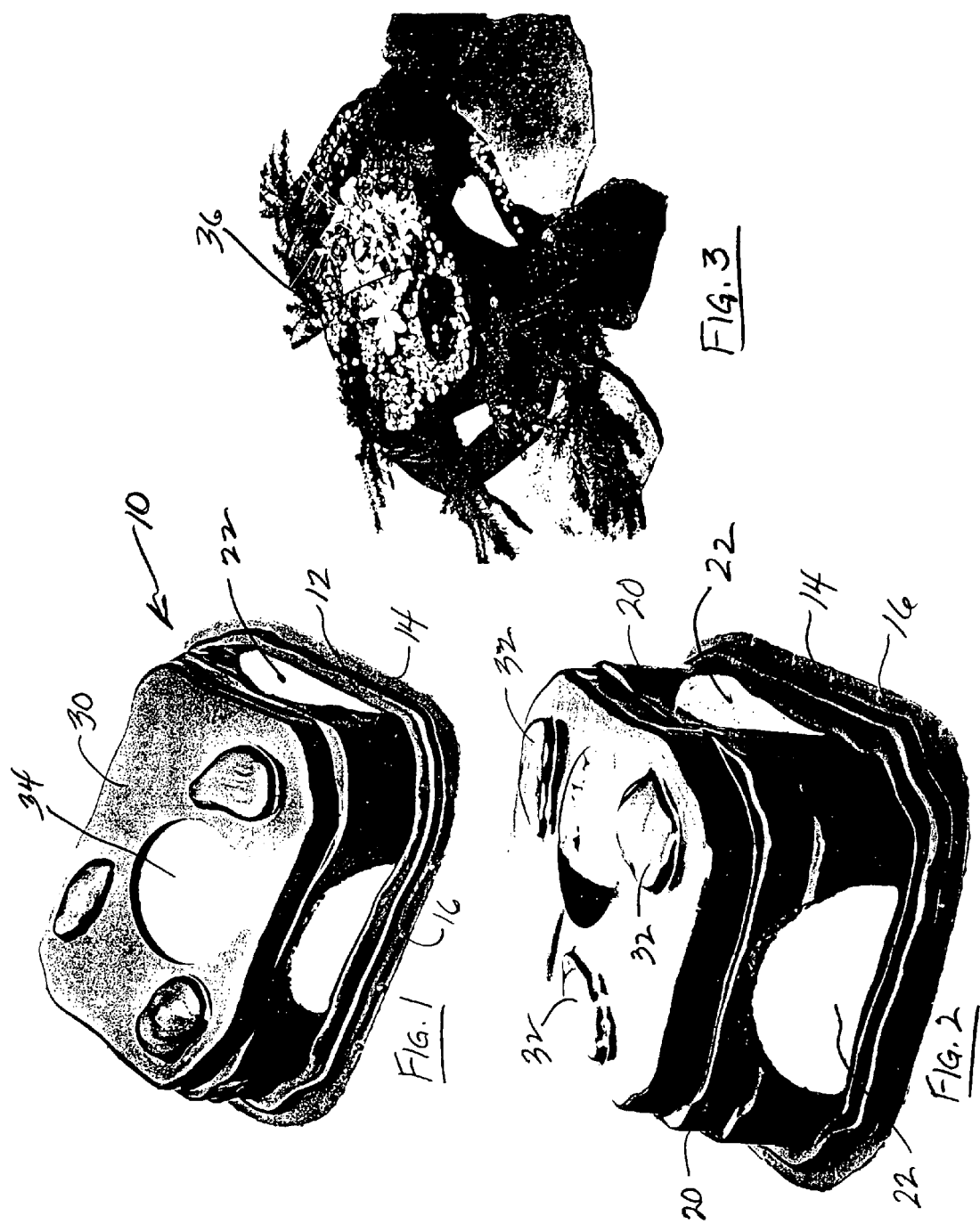

GARDEN POND SHELTER REEF

CROSS-REFERENCE TO RELATED APPLICATION

This application relates to my Provisional Patent Applicaton No. 60/442,744 which was filed on Jan. 27, 2003 now abandoned. That filing date is claimed for this application.

BACKGROUND OF THE INVENTION

This invention is a shelter device or pond reef to protect fish and other aquatic animals in a garden pond from predator birds.

Fish in an open garden pond are generally visible in daylight. They are easy prey for predator birds, and birds do prey on them. The fish shelter reef of this invention provides a hiding place or barrier to protect fish and other aquatic pond animals from predator birds.

SUMMARY OF THE INVENTION

In summary, this invention is an artificial pond reef formed from sheet material into the shape of an inverted tub. It includes a peripheral base portion, upstanding sidewalls, and a roof. The base portion includes a horizontal flange extending out from the sidewalls. The sidewalls extend up to support the roof and include apertures for movement of fish and the like through the reef. The reef includes small holes for the growth of flora therethrough. The roof is configured to support and retain decorative enhancements (pebbles, sand, plants). The base, sidewalls, roof are surface-shaped and contoured to give the reef an appearance of natural rock formation. The reef is dark or black to promote bacteria growth upon it, and has a matte surface for bacteria to adhere to. An opening in the roof is for a removable receptacle for decorative enhancements.

BRIEF DESCRIPTION OF DRAWINGS

In the accompanying drawing:

FIGS. 1–3 are various pictorial views of a garden pond shelter reef of this invention.

DETAILED DESCRIPTION

With reference to the drawing, the fish shelter reef 10 of this invention is a single piece, drawn or otherwise formed from sheet of plastic material into the general configuration of an inverted washtub, as shown.

The reef 10 includes a supporting peripheral base 12, sidewalls 20 extending up from the base and supporting a roof 30. The peripheral base 12 includes an outward extending horizontal flange 14. The flange 14 provides bottom surface area to support the device, and top surface area on which to place pebbles, sand, or the like to disguise it.

The sidewalls 20 each include one or more large apertures 22 to permit fish to move freely in and out through the reef 10.

The roof 30 includes convex-upward protuberances 32, and a central opening 34, a round hole to receive a removable receptacle such as a pot 36 for a marine plant, or for pebbles or the like to enhance the overall natural appearance of the reef.

The reef 10 includes a number of ½" to ¾" diameter holes 16 through some or all of the base 12, sidewalls 20, and roof 30, to permit growth of marine weeds through them.

The base 12, sidewalls 20, and top 30 are not flat or plain surfaced; they are shaped and contoured as shown to give the device the appearance of natural rock formation.

The reef 10 is formed of non-toxic low density polyethylene. The reef is of a matte finish, and is preferably black or dark gray. A black or dark surface promotes the growth of bacteria on it, and bacteria cling to a matte surface more effectively than to a smooth shiny finish. Bacteria are ecologically beneficial here. They consume fish and aquatic animal waste, such as nitrite, feces, and ammonia, to keep the pond water clear.

The foregoing description of a preferred embodiment of this invention sets forth the best mode presently contemplated by the inventor of carrying out this invention. Any details as to materials, quantities, dimensions, and the like are intended as illustrative. The concept and scope of the invention are limited not by the description but only by the following claims and equivalents thereof.

What is claimed is:

1. An artificial pond reef, said reef being of plastic, non-reticulate sheet material having a matte finish in the general shape of an inverted tub, said pond reef including a peripheral base portion, sidewalls extending up from said base portion, and a roof disposed substantially orthogonal to the sidewalls;

said base portion including a horizontal flange extending out from said sidewalls;

said sidewalls extending up from said base portion and supporting said roof, said sidewalls including apertures for movement of marine life through said reef;

said roof adapted to support and retain decorative enhancements thereon having outwardly-convex proturberances extending therefrom;

said reef including holes through said sheet material for the growth of flora therethrough;

said base portion, sidewalls, and roof being surface-shaped and contoured to give said reef an appearance of natural rock formation.

2. An artificial pond reef as defined in claim 1, said roof further including an opening to receive a removable receptacle for decorative enhancements.

3. An artificial pond reef formed from sheet plastic, non-reticulate material having a matte finish and in the shape of an inverted tub or the like, said pond reef including a peripheral supporting base portion, generally vertical sidewalls extending up from said base portion, and a roof disposed substantially orthogonal to the sidewalls;

said base portion extending outward from said sidewalls, and including a horizontal flange;

said sidewalls extending up from said base portion and supporting said roof, said sidewalls including apertures for movement of fish and other marine life through said reef;

said roof configured and adapted to support and retain decorative enhancements thereon and having outwardly-convex protuberances extending therefrom;

said reef including holes through said sheet material to permit and guide the growth of flora therethrough;

said base portion, sidewalls, and roof being surface-shaped and contoured to give said reef an appearance of natural rock formation.

4. An artificial pond reef as defined in claim 3, said roof further including an opening to receive a removable receptacle for decorative enhancements.

* * * * *